United States Patent [19]
Bausenhart et al.

[11] Patent Number: 5,473,895
[45] Date of Patent: Dec. 12, 1995

[54] HYDROSTATIC TRAVELLING DRIVE

[75] Inventors: Heinz Bausenhart, Nersingen-Leibi; Karl-Heinz Leibing, Gerstetten-Dettingen, both of Germany

[73] Assignee: Hydromatik GmbH, Elchingen, Germany

[21] Appl. No.: 25,624

[22] Filed: Mar. 2, 1993

[30] Foreign Application Priority Data

Mar. 4, 1992 [DE] Germany .......................... 42 06 833.9

[51] Int. Cl.[6] .......................... F16H 61/42; B60K 17/10; F16D 31/02
[52] U.S. Cl. ................... 60/448; 60/490; 180/307
[58] Field of Search ........................ 60/448, 490, 491; 180/307

[56] References Cited

U.S. PATENT DOCUMENTS

| | | | |
|---|---|---|---|
| 3,914,938 | 10/1975 | Cornell et al. | 60/420 X |
| 4,399,886 | 8/1983 | Pollman | 180/307 X |
| 4,401,182 | 8/1983 | Pollman | 180/307 X |
| 4,445,329 | 5/1984 | Drisko | 60/448 X |
| 4,474,104 | 10/1984 | Creffield | 60/448 X |
| 4,679,396 | 7/1987 | Heggie | 60/490 X |
| 4,983,099 | 1/1991 | Tsai | 60/448 X |
| 5,042,251 | 8/1991 | Berthold | 60/448 |
| 5,070,695 | 12/1991 | Metzner | 60/448 |
| 5,071,391 | 12/1991 | Kita | 475/80 |
| 5,184,466 | 2/1993 | Schniederjan et al. | 60/448 |

FOREIGN PATENT DOCUMENTS 517294  7/1938  United Kingdom ....................... 60/448

*Primary Examiner*—John E. Ryznic
*Attorney, Agent, or Firm*—Scully, Scott, Murphy & Presser

[57] ABSTRACT

The invention relates to a hydrostatic travelling drive for a vehicle, having a primary-adjustable and secondary-adjustable hydrostatic driving gear, which comprises at least two hydraulic machines in the form of a hydraulic pump drivable by a drive motor of the vehicle and a hydraulic motor connected to the hydraulic pump by way of at least one operating line, both of which can be adjusted in their respective stroke volume in dependence upon a control signal changing with the load of the driving gear. To avoid disturbances of the secondary adjustment of the hydrostatic driving gear through momentarily or rapidly occurring fluctuations of the driving-gear load, as control signal for adjusting the hydraulic motor a travelling-speed signal generated by a sensor device and corresponding with the travelling speed of the vehicle is used which with increasing travelling speed effects a swinging-back of the hydraulic motor, i.e. an adjustment in the direction of its minimum stroke volume.

6 Claims, 2 Drawing Sheets

HYDROSTATIC TRAVELLING DRIVE

TECHNICAL FIELD OF THE INVENTION

The invention relates to a hydrostatic travelling drive.

BACKGROUND OF THE INVENTION AND PRIOR ART

Travelling drives of this kind are known from practice and are described, for example, in special print no. 1/79 (fluid February 1979), published by Hydromatik GmbH, for a wheel loader. The hydrostatic driving gear of this known travelling drive, for the purpose of changing its transmission ratio, is primary-adjustable in a first travel range, i.e. by changing the stroke volume of the hydraulic pump, and secondary-adjustable in a second travel range, i.e. by changing the stroke volume of the hydraulic motor, and consequently has a large conversion range, which allows the application of large tractive forces on the one hand and the attainment of high travelling speeds on the other hand. Both the primary and the secondary adjustment take place in dependence upon a control pressure proportional to the speed of the drive motor and changing with its load. In addition, a pressure regulation is provided, which adjusts the hydraulic motor in dependence upon the operating pressure in the operating line, likewise changing with the load, in such a way that it generates the respectively required torque necessary to overcome the respective travel resistance.

This known travelling drive has proven itself in practice; although in certain travel situations it leads to superfluous and disturbing irregularities of the travelling speed. These are, for example, travel situations with changes of the driving-gear load, for example due to load fluctuations of an operating or work drive connected to the travelling drive or fluctuations of the travel resistance, which occur for such a short period, for example upon the crossing of so-called corrugated-sheet tracks or potholes with the consequence of pressure peaks in the operating line or slipping of drive wheels, that, due to the speed-dependent control and pressure regulation used, they lead to an undesirably rapid response and adjustment of the hydrostatic driving gear.

OBJECT OF THE INVENTION

The object of the invention is to develop a travelling drive in such a way that disturbances of the secondary adjustment of its hydrostatic driving gear through changing driving-gear loads of the type described above are avoided.

SUMMARY OF THE INVENTION

According to the present invention there is provided an hydrostatic travelling drive for a vehicle, having a primary-adjustable and secondary-adjustable hydrostatic driving gear, which comprises at least two hydraulic machines in the form of a hydraulic pump drivable by a drive motor of the vehicle and a hydraulic motor connected to the hydraulic pump by way of at least one operating line, both the hydraulic pump and hydraulic motor being adjustable in their respective stroke volume in dependence upon a control signal changing with the load of the driving gear, wherein the control signal for adjusting the hydraulic motor is a travelling-speed signal generated by a sensor device and corresponding with the travelling speed of the vehicle, which signal with increasing travelling speed effects a swinging-back of the hydraulic motor, i.e. an adjustment in the direction of its minimum stroke volume.

With the present invention the speed-dependent control and pressure regulation known in the prior art and the corresponding constructional outlay are omitted for the secondary adjustment, which is now effected in dependence upon the travelling speed. In this way all disturbances of the secondary adjustment through momentary or rapid changes of the driving-gear loads cease; only those load changes which generate a corresponding change of the travelling speed still affect the secondary adjustment and lead to a change of the transmission ratio for the purpose of adaptation to the respective load change.

Although not restricted thereto, the invention is particularly suitable for mobile operating machines for off-road use, which, due to higher capacities and the use of mechanical switch gears, attain high travelling speeds. In this respect, wheel loaders are to be mentioned in particular, which with higher speeds are inclined to suffer pitch oscillations or "jumping" and which with their secondary adjustment provided in accordance with the invention travel with even speed which is uninfluenced by the pitch oscillations.

The primary adjustment of the hydrostatic driving gear can likewise take place in dependence upon the travelling speed, but also upon the speed of the drive motor with the advantage of the control of the hydraulic pump and the hydraulic motor by means of two independent parameters. With use in rough terrain, whereby one usually drives in the first travel range, a rapid feedback of increased travel resistances can be attained through the so-called pressure regulation of the hydraulic pump; as long as the hydraulic motor remains set at maximum stroke volume, this pressure regulation is effective and adjusts the hydraulic pump in dependence upon a control signal derived from the operating pressure in the operating line, whereby increasing operating pressure effects an adjustment in the direction of minimum stroke volume.

The detection of the travelling speed can occur in different ways, for example by way of a sensor according to the Doppler radar principle or by way of sensors such as measuring pumps, tacho-generators or pulse receivers, which are advantageously arranged on non-driven wheels or mechanical driving gears.

Sensor devices which generate electrical signals are preferred. This enables the use of an electronic control unit which converts the received control signals into swivel-angle signals and, with these, controls the respective hydraulic machine for the purpose of adjusting its stroke volume. The conversion of the control signals takes place on the basis of at least in each case one characteristic curve, stored in the electronic control unit, of the swivel angle or of the appropriate stroke volume of each hydraulic machine in dependence upon the parameter (travelling speed, speed or operating pressure) picked up by the respective control signal.

According to a development of the invention the characteristic curves of the two hydraulic machines have such a common, specified intersecting point that they define a travel range in which the hydraulic pump and the hydraulic motor are simultaneously controllable by the electronic control unit. Favourable in this respect is a position of the intersecting point of the two characteristic curves such that the travel range defined thereby is a second travel range of average or medium travelling speed, to which adjoin a first travel range of lower travelling speed with sole control of the hydraulic pump and a third travel range of higher travelling speed with sole control of the hydraulic motor. For the purpose of adaptation to different usage conditions the characteristic curves of the two hydraulic machines can have different gradients and also a non-linear form.

The beginning of this second travel range can be displaced by setting the intersecting point of the characteristic curves of the two hydraulic machines in a setting device connected to the electronic control unit, by displacement of the characteristic curve of the hydraulic motor.

An advantageous development of the invention is characterized by a third sensor device for detecting the respectively set desired speed of the drive motor and for emitting an appropriate control signal to the electronic control unit, which unit contains a programme for detecting labouring of the drive motor from the control signals of the second and the third sensor device and with increasing labouring of the drive motor displaces the characteristic curve of the hydraulic motor and thus the beginning of the second travel range in the direction of a reduction of the same. In this way, upon use in, for example, rough terrain, the hydrostatic driving gear remains in the first travel range for the duration of the labouring of the drive motor, this being particularly advantageous when the pressure regulation is used and, if desired, the swivel-angle characteristic curve of the hydraulic pump is designed to be flatter than that of the hydraulic motor.

BRIEF DESCRIPTION OF THE DRAWINGS

The invention is described in more detail in the following with reference to the drawings.

DETAILED DESCRIPTION OF PREFERRED EMBODIMENTS ACCORDING TO THE INVENTION

Figure 1:
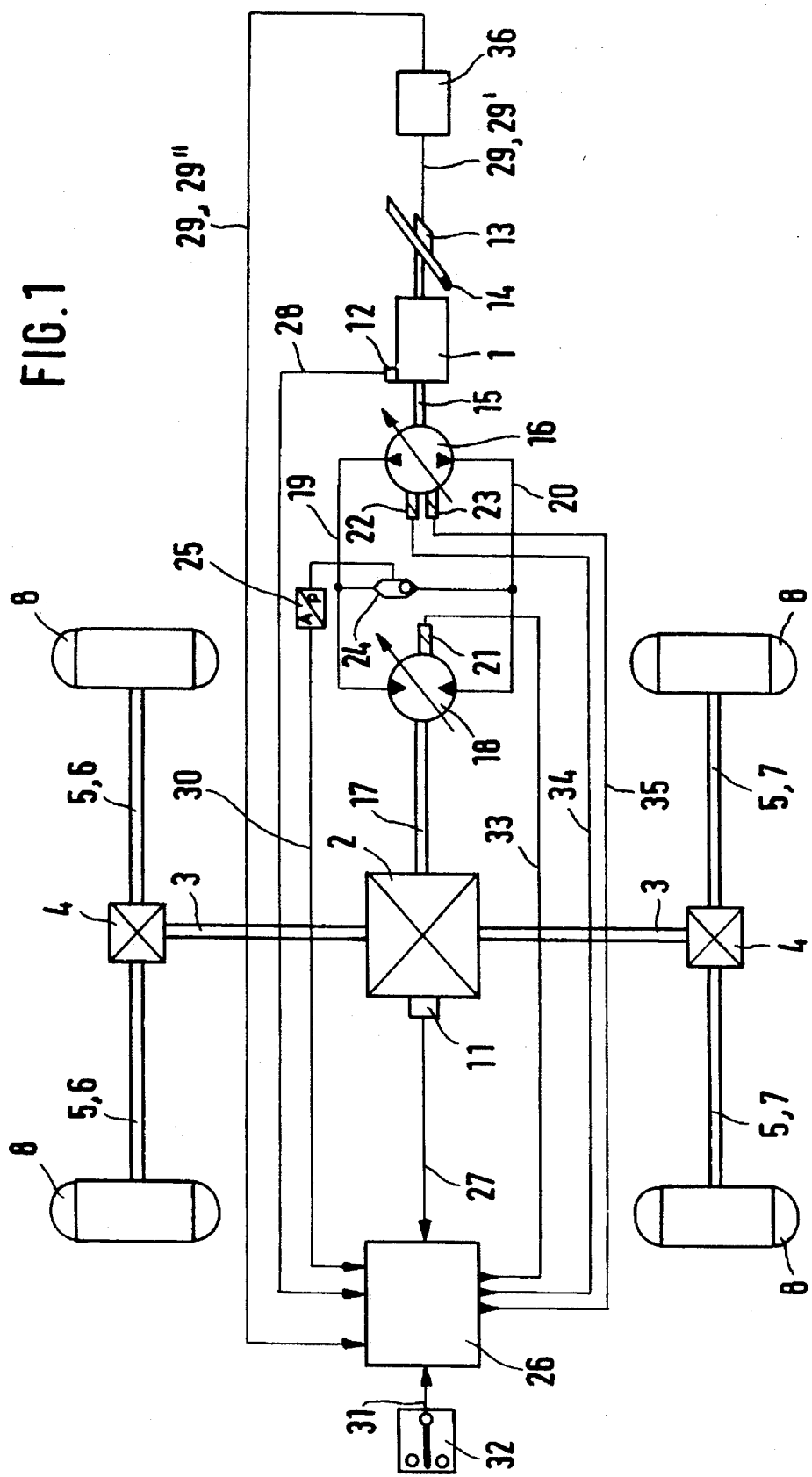
FIG. 1 shows a block diagram of a wheel loader, the travelling drive of which comprises a hydrostatic driving gear, the transmission ratio of which can be adjusted according to the two embodiments of the invention.

The wheel loader represented in the drawing comprises a drive motor 1 with adjustable speed, for example a diesel motor, a hydrostatic travelling drive, to which there is connected an operating drive, not shown, and a mechanical distributor gear 2 which is mechanically connected by way of in each case a Cardan shaft 3 and in each case a differential 4 to the drive shafts 5 of a front axle 6 and a rear axle 7 with in each case two drive wheels 8.

The distributor gear 2 is provided with a first sensor device 11 in the form of a speed sensor for the purpose of detecting its output speed which is proportional to the travelling speed v of the wheel loader. A second and third sensor device 12 and 13, the former likewise in the form of a speed sensor and the latter in the form of a potentiometer, are provided for determining the speed n actually appearing and the desired speed of the drive motor 1. An accelerator pedal 14 serves to specify the desired speed, the respective position of which accelerator pedal is determined by the potentiometer 13.

The hydrostatic travelling drive comprises a primary-adjustable and secondary-adjustable hydrostatic driving gear with a hydraulic pump 16 drivable by the drive motor 1 by way of a drive shaft 15, for example an axial piston pump in swash-plate type of construction, and a hydraulic motor 18 connected to the distributor gear 2 by way of an output shaft 17, for example an axial piston motor in bent-axis type of construction, which is connected by way of two hydraulic operating lines 19, 20 to the hydraulic pump 16. The hydraulic pump 16 is a reversible adjustable displacement pump and, like the hydraulic motor 18 constructed as adjusting motor, has two directions of flow. Both hydraulic machines 16, 18 are provided with a proportional-electrical control for the purpose of adjusting their stroke volume. In the case of the hydraulic motor 18 this control comprises a proportional magnet 21 and a proportional valve controlled thereby, not shown, as well as an adjustment cylinder, likewise not shown, for which the adjusting pressure is taken from the high-pressure side of the hydraulic motor. The proportional-electrical control for the hydraulic pump 16 corresponds in principle with the control just described, but comprises two proportional magnets 22, 23, one for forward drive and one for reverse drive.

Both operating lines 19, 20 are connected by way of line sections to a change-over valve 24, from where a further line section leads to a p/A (pressure to electrical signal) converter 25.

The hydrostatic travelling drive comprises, furthermore, an electronic control unit 26 which can also be constructed with microprocessor. Input variables for the electronic control unit 26 are the output speed of the distributor gear 2, representative of the travelling speed v of the vehicle, the speed n of the drive motor 1, its desired speed, the operating pressure in the hydrostatic driving gear and the respectively desired drive direction. To transmit the appropriate signals the electronic control unit 26 is connected by way of signal lines 27 to 31 to the first, second and third sensor devices 11, 12 and 13, to the p/A converter 25 and to a drive-direction switch 32.

As output variables the electrical control unit 26 supplies control (current) signals to the proportional magnets 21 to 23 of the proportional-electrical controls of the hydraulic machines 16, 18, in order to adjust their swivel angle α and thus their stroke volume. To transmit these control (current) signals, hereinafter called swivel-angle signals, the electronic control unit 26 is connected by way of signal lines 33 to 35 to the proportional magnet 21 of the hydraulic motor 18 and to the proportional magnets 22, 23 of the hydraulic pump 16.

The electronic control unit 26 is equipped with control circuit logic for the primary and the secondary adjustment of the hydrostatic driving gear and with a memory in which, according to a first embodiment of the invention, there is stored the characteristic curve $KL_1$ of the swivel angel α of the hydraulic pump 16 in dependence upon the speed n of the drive motor 1 and the appropriate characteristic curve $KL_2$ of the hydraulic motor 18 in dependence upon the travelling speed v. According to a second embodiment of the invention the memory contains the characteristic curves of both hydraulic machines 16, 18 in dependence upon the travelling speed v.

Figure 2:
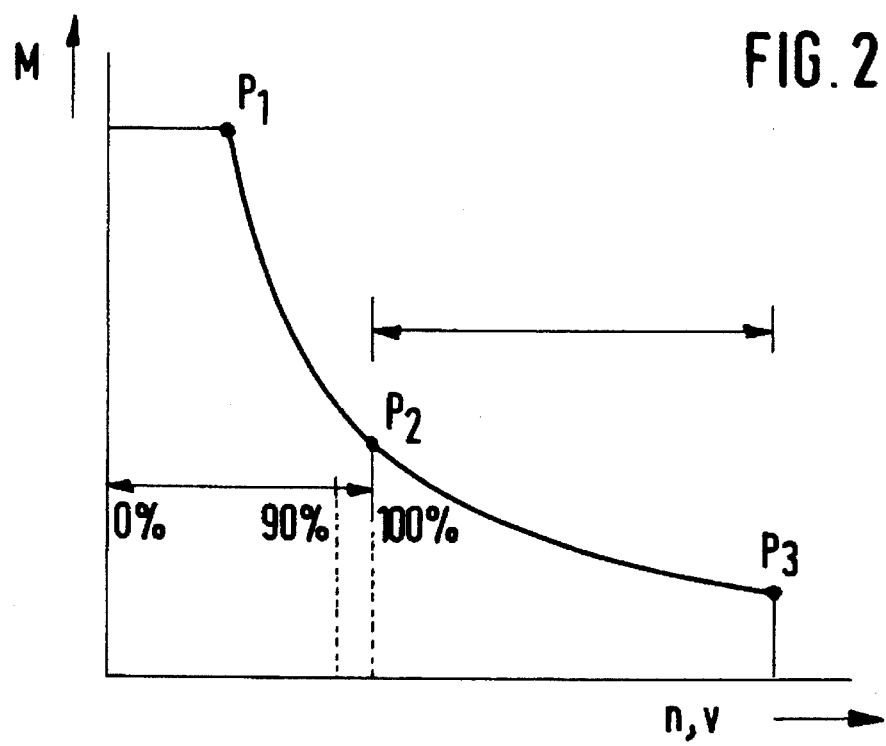
FIG. 2 shows a diagram which represents the torque, delivered by the hydrostatic driving gear, across the entire conversion range.

The characteristic curve $KL_1$ shows, taken together with FIG. 2, the primary adjustment of the hydrostatic driving gear through adjustment of the hydraulic pump 16 which, starting from a swivel angle $α_o$, is swung out from the value zero at idling speed $n_o$ of the drive motor 1 with increasing drive motor speed n (according to the 1st embodiment of the invention) or the travelling speed v (according to the 2nd embodiment of the invention) to its maximum swivel angle $α_{max}$. Accordingly, the transmission ratio of the hydrostatic driving gear reduces, whereby in a first partial region up to the point $P_1$ of the torque characteristic shown in FIG. 2 the torque delivered by the hydraulic pump 16 remains constant with constant operating pressure until reaching the maximum power of the drive motor 1 and in a second partial region drops hyperbolically to the point $P_2$ of the torque characteristic shown in FIG. 2 indicating the end of the primary adjustment.

The characteristic curve $KL_2$ corresponds with the secondary adjustment of the hydrostatic driving gear which takes place through adjustment of the hydraulic motor 18, which, starting from its maximum swivel angle $\alpha_{max}$ with increasing travelling speed v is swung back to its minimum swivel angle $\alpha_{min}$. With the appropriate reduction of the transmission ratio of the hydrostatic driving gear the torque delivered by the hydraulic motor 18 decreases to the point $P_3$ of the torque characteristic in FIG. 2.

Figure 3:
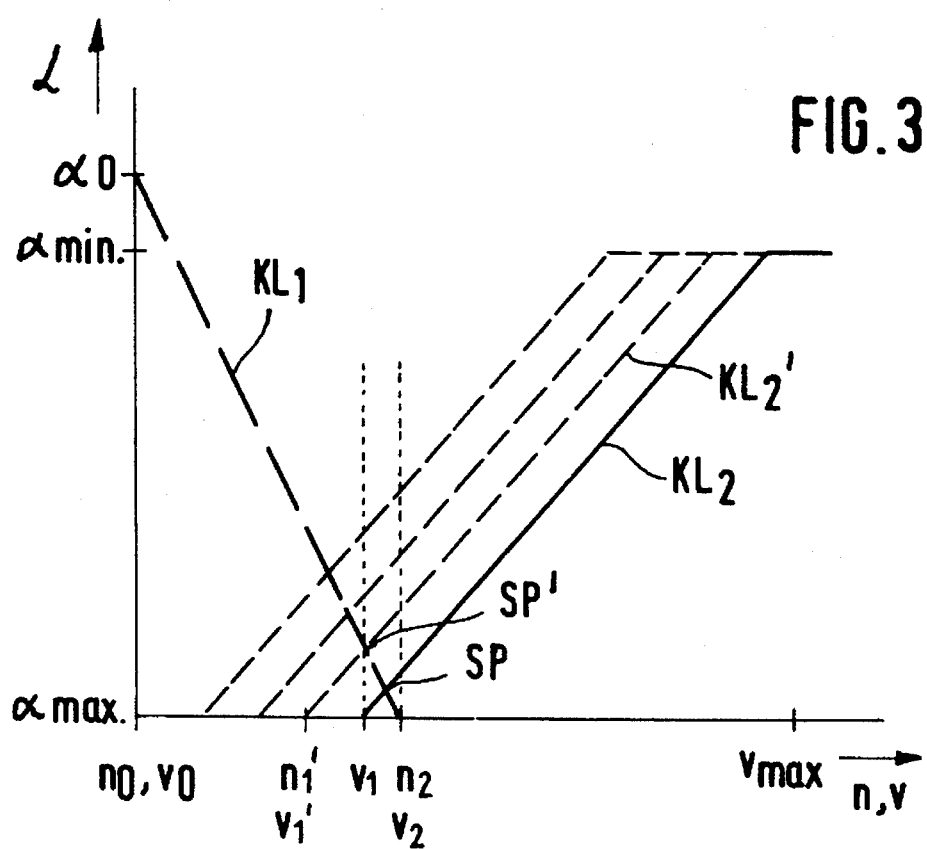
FIG. 3 shows a diagram which represents the characteristic curve of the swivel angle of each of the two hydraulic machines of the hydrostatic driving gear according to FIG. 1 across the entire conversion range.

The two characteristic curves $Kl_1$, $KL_2$ intersect in a common intersecting point SP above the abscissa indicating the maximum swivel angle $\alpha_{max}$ of the hydraulic machines 16, 18 in FIG. 3 and define in this way between their intersecting points with the abscissa a second travel range of average or middle travelling speed, in which both hydraulic machines 16, 18 are simultaneously adjusted. The beginning of this second travel range, where the hydraulic pump 16 is swung out to about 90% of its maximum stroke volume, is fixed by the travelling speed $v_1$. Its end, where the hydraulic pump 16 is swung back to the maximum swivel angle $\alpha_{max}$ and the hydraulic motor 18 to about 90% of its maximum stroke volume, is determined by the speed $n_2$ of the drive motor 1 (according to the first embodiment of the invention) or by the travelling speed $v_2$ (according to the second embodiment of the invention).

Between the idling speed $n_o$ and the beginning of the second travel range at $v_1$ lies a first travel range of lower travelling speed, in which only the hydraulic pump 16 is adjusted. In the third travel range of higher travelling speed, adjoining the second travel range and reaching up to the maximum travelling speed $v_{max}$, only the adjustment of the hydraulic motor 18 takes place.

As can be seen from FIG. 3 (cf. broken lines extending parallel to $KL_2$), there is the possibility of arbitrarily displacing the characteristic curve $KL_2$ of the hydraulic motor 18 within the first travel range. For this purpose a setting device 36 is provided, which is connected by way of a partial section 29' of the signal line 29 to the third sensor device 13 and by way of a second partial section 29" of the signal line 29 to the electronic control unit 26. The setting device 36 allows, through setting of any desired travelling speed, for example $v_1'$, which is smaller than $v_1$, the fixing of the beginning of the second travel range and thus the intersecting point, for example SP' of both characteristic curves $KL_1$, $KL_2'$, i.e. the reduction of the first travel range and the enlarging of the second travel range accordingly. By way of a line, not shown, the setting device 36 is connected to the electronic control unit 26 and in reaction to the input of $v_1'$ is set by this to that speed $n_1'$ which corresponds with the specified travelling speed $v_1'$ when the drive motor 1 is not labouring, when, that is to say, the speed n actually appearing agrees with the desired speed specified by the accelerator pedal 14.

The operating behaviour of the hydrostatic travelling drive according to the invention is explained in the following with reference to its first embodiment.

When the wheel loader is at a standstill the drive motor 1 runs with idling speed $n_o$. The hydraulic pump 16 is set at zero stroke volume according to the swivel angle $\alpha_o$ and the hydraulic motor 18 to maximum swivel angle $\alpha_{max}$. Through actuation of the accelerator pedal 14 the speed n of the drive motor 1 is increased, detected by the speed sensor 12 and signalled by way of the signal line 28 to the electronic control unit 26. Its circuit logic determines from the characteristic curve $KL_1$ the respectively associated swivel angle $\alpha$ and controls with an appropriate control (current) signal that proportional magnet 22 or 23 which is associated with the drive direction selected by the drive-direction switch 32. The controlled proportional magnet 22 or 23 swings the hydraulic pump 16 out to the swivel angle $\alpha$ determined by the circuit logic. As soon as the hydraulic pump 16 delivers an adequate conveying flow, the hydraulic motor 18 begins to rotate and the wheel loader is set in motion. With further increasing speed n of the drive motor 1 the hydraulic pump 16 is swung out further so that the travelling speed v of the wheel loader increases. No control of the proportional magnet 21 of the hydraulic motor 18 takes place; the wheel loader travels in the first travel range.

Within the first travel range, with increased load of the hydrostatic driving gear, for example due to higher travel resistances or the use of the operating drive, the so-called pressure regulation is put into action. As soon as the operating pressure in the respectively high-pressure-loaded operating line 19 or 20 exceeds a maximum value specified in the electronic control unit 26, the circuit logic controls in accordance with a stored programme the proportional magnet 22 or 23 with such a control (current) signal that the hydraulic pump 16 is swung back to the swivel angle necessary for keeping the specified maximum value of the operating pressure constant. In this way the drive power of the hydraulic pump is automatically adapted to the momentarily required hydraulic power. With reduction of the swivel angle $\alpha$ of the hydraulic pump 16 in the region of the torque curve located between $P_1$ and $P_2$ according to FIG. 2 a torque increase results.

As soon as that the accelerator pedal 14 specifies the desired speed which corresponds with the speed $n_1'$, to which the setting device 36 is set, the latter relays the appropriate desired-speed signal generated by the potentiometer 13 to the electronic control unit 26, which establishes through comparison with the speed signal from the speed sensor 12, which determines the speed n of the drive motor 1 actually appearing, whether there is labouring of the drive motor 1. If this is not the case, then the electronic control unit 26 controls the proportional magnet 21 with a swivel-angle signal which is determined by its circuit logic from the characteristic curve $KL_2$, starting from the output speed of the distributor gear 2, signalled by the speed sensor 11, representative of the momentary travelling speed v over ground. The proportional magnet 21 swings the hydraulic motor 18 back in the direction of a smaller swivel angle. The second travel range has thus begun; the pressure regulation of the hydraulic pump 16 is disconnected, both hydraulic machines 16, 18 are adjusted together, whereby it is ensured that no premature travelling-speed state of equilibrium occurs which prevents an increase of the travelling speed. As soon as the hydraulic pump 16 upon reaching the speed $n_2$ of the drive motor 1 is set at its maximum swivel angle $\alpha_{max}$, the second travel range ends and the third travel range begins.

If, on the other hand, due to corresponding travel resistances there is labouring of the drive motor 1, the electronic control unit 26 delays the control of the proportional magnet 21 accordingly and in this way displaces the beginning of the second travel range in the direction of higher travelling speed, up to a maximum reaching $v_1$, at which travelling speed the hydraulic motor 18 according to the determination in the electronic control unit 26 begins to swing back. By displacing the beginning of the second travel range with laboring of the drive motor 1 it is achieved that the vehicle travels, at maximum up to the travelling speed $v_1$, in the first travel range of lower travelling speed, in order to use the high output torque of the hydrostatic driving gear and a rapid adaptation of this output torque to the respectively occurring travel resistances through the pressure regulation, which is discontinued in the second and third travel range.

In the third travel range the hydraulic motor 18 is swung back in the same manner as in the second travel range with increasing travelling speed v and increasing output speed of the distributor gear 2 until reaching its minimum swivel angle $\alpha_{min}$ and thus up to the maximum travelling speed.

What is claimed is:

1. Hydrostatic travelling drive for a vehicle having a primary-adjustable and secondary-adjustable hydrostatic driving gear, which comprises at least two hydraulic machines in the form of a hydraulic pump drivable by a drive motor of the vehicle and a hydraulic motor connected to the hydraulic pump by way of at least one operating line, both the hydraulic pump and hydraulic motor being adjustable in their respective stroke volume in dependence upon a control signal changing with the load of the driving gear, wherein the control signal for adjusting the hydraulic motor is a travelling-speed signal generated by a sensor device and corresponding with the travelling speed of the vehicle, which signal with increasing travelling speed causes a reduction in the stroke volume of the hydraulic motor, and wherein the control signal for adjusting the hydraulic pump is a further travelling-speed signal generated by the sensor device, which signal with increasing travelling speed causes an increase in the stroke volume of the hydraulic pump;

- an electronic control unit for receiving the respective control signals and for controlling the hydraulic pump and the hydraulic motor for the purpose of adjusting the same with swivel-angle signals, derived by the electronic control unit from the control signals on the basis of at least one stored characteristic curve of the swivel angle of each hydraulic machine in association with an operating parameter picked up by the respective control signals;
- the characteristic curves of both hydraulic machines having a common, specified intersecting point such that they define a travel range in which the hydraulic pump and the hydraulic motor are simultaneously controllable by the electronic control unit;
- the travel range defined by the intersecting point of the two characteristic curves being a second travel range of average or medium travelling speed, to which adjoin a first travel range of lower travelling speed with sole control of the hydraulic pump and a third travel range of higher travelling speed with sole control of the hydraulic motor; and
- a setting device being connected to the electronic control unit for setting the intersecting point of the characteristic curves of the two hydraulic machines through displacement of the characteristic curve of the hydraulic motor and thus of the beginning of the second travel range.

2. Hydrostatic travelling drive for a vehicle having a primary-adjustable and secondary-adjustable hydrostatic driving gear, which comprises at least two hydraulic machines in the form of a hydraulic pump drivable by a drive motor of the vehicle and a hydraulic motor connected to the hydraulic pump by way of at least one operating line, both the hydraulic pump and hydraulic motor being adjustable in their respective stroke volume in dependence upon a control signal changing with the load of the driving gear, wherein the control signal for adjusting the hydraulic motor is a travelling-speed signal generated by a sensor device and corresponding with the travelling speed of the vehicle, which signal with increasing travelling speed causes a reduction in the stroke volume of the hydraulic motor, and wherein the control signal for adjusting the hydraulic pump is a speed signal generated by a second sensor device and corresponds with the speed of the drive motor of the vehicle, which signal at increasing speed of the drive motor causes an increase in the stroke volume of the hydraulic pump;

- an electronic control unit for receiving the respective control signals and for controlling the hydraulic pump and the hydraulic motor for the purpose of adjusting the same with swivel-angle signals, derived by the electronic control unit from the control signals on the basis of at least one stored characteristic curve of the swivel angle of each hydraulic machine in association with an operating parameter picked up by the respective control signals; and
- a third sensor device for determining the respectively set desired speed of the drive motor and for emitting an appropriate control signal to the electronic control unit, which unit contains a program for detecting laboring of the drive motor from the control signals of the second and the third sensor device and with increasing laboring of the drive motor displaces the characteristic curve of the hydraulic motor and thus the beginning of the second travel range in the direction of a reduction of the same.

3. Hydrostatic travelling drive for a vehicle having a primary-adjustable and secondary-adjustable hydrostatic driving gear, which comprises at least two hydraulic machines in the form of a hydraulic pump drivable by a drive motor of the vehicle and a hydraulic motor connected to the hydraulic pump by way of at least one operating line, both the hydraulic pump and hydraulic motor being adjustable in their respective stroke volume in dependence upon a control signal changing with the load of the driving gear, wherein the control signal for adjusting the hydraulic motor is a travelling-speed signal generated by a sensor device and corresponding with the travelling speed of the vehicle, which signal with increasing travelling speed causes a reduction in the stroke volume of the hydraulic motor, and wherein the control signal for adjusting the hydraulic pump is a speed signal generated by a second sensor device and corresponds with the speed of the drive motor of the vehicle, which signal at increasing speed of the drive motor causes an increase in the stroke volume of the hydraulic pump;

- an electronic control unit for receiving the respective control signals and for controlling the hydraulic pump and the hydraulic motor for the purpose of adjusting the same with swivel-angle signals, derived by the electronic control unit from the control signals on the basis of at least one stored characteristic curve of the swivel angle of each hydraulic machine in association with an operating parameter picked up by the respective control signals;
- a third sensor device for determining the respectively set desired speed of the drive motor and for emitting an appropriate control signal to the electronic control unit, which unit contains a program for detecting laboring of the drive motor from the control signals of the second and the third sensor device and with increasing laboring of the drive motor displaces the characteristic curve of the hydraulic motor and thus the beginning of the second travel range in the direction of a reduction of the same; and wherein upon the setting of the hydraulic motor to maximum stroke volume the hydraulic pump is adjustable in dependence upon a control signal derived from the operating pressure in the operating line, whereby increasing operating pressure effects an adjustment in the direction of minimum stroke volume.

4. Hydrostatic travelling drive for a vehicle having a primary-adjustable and secondary-adjustable hydrostatic driving gear, which comprises at least two hydraulic machines in the form of a hydraulic pump drivable by a drive motor of the vehicle and a hydraulic motor connected to the hydraulic pump by way of at least one operating line, both the hydraulic pump and hydraulic motor being adjustable in their respective stroke volume in dependence upon a control signal changing with the load of the driving gear, wherein the control signal for adjusting the hydraulic motor is a travelling-speed signal generated by a sensor device and corresponding with the travelling speed, of the vehicle, which signal with increasing travelling speed causes a reduction in the stroke volume of the hydraulic motor, and wherein the control signal for adjusting the hydraulic pump is a speed signal generated by a second sensor device and corresponds with the speed of the drive motor of the vehicle, which signal at increasing speed of the drive motor causes an increase in the stroke volume of the hydraulic pump;

an electronic control unit for receiving the respective control signals and for controlling the hydraulic pump and the hydraulic motor for the purpose of adjusting the same with swivel-angle signals, derived by the electronic control unit from the control signals on the basis of at least one stored characteristic curve of the swivel angle of each hydraulic machine in association with an operating parameter picked up by the respective control signals;

the characteristic curves of both hydraulic machines having a common, specified intersecting point such that they define a travel range in which the hydraulic pump and the hydraulic motor are simultaneously controllable by the electronic control unit;

the travel range defined by the intersecting point of the two characteristic curves being a second travel range of average or medium travelling speed, to which adjoin a first travel range of lower travelling speed with sole control of the hydraulic pump and a third travel range of higher travelling speed with sole control of the hydraulic motor; and a setting device being connected to the electronic control unit for setting the intersecting point of the characteristic curves of the two hydraulic machines through displacement of the characteristic curve of the hydraulic motor and thus of the beginning of the second travel range.

5. Hydrostatic travelling drive according to claim 2 or 3 or 4, wherein a third sensor device determines the respectively set desired speed of the drive motor and for emitting an appropriate control signal to the electronic control unit, which unit contains a program for detecting laboring of the drive motor from the control signals of the second and the third sensor device and with increasing laboring of the drive motor displaces the characteristic curve of the hydraulic motor and thus the beginning of the second travel range in the direction of a reduction of the same.

6. Hydrostatic travelling drive according to claim 1 or 2 or 3 or 4, wherein upon the setting of the hydraulic motor to maximum stroke volume the hydraulic pump is adjustable in dependence upon a control signal derived from the operating pressure in the operating line, whereby increasing operating pressure effects an adjustment in the direction of minimum stroke volume.

* * * * *